United States Patent [19]
Stoneburner et al.

[11] Patent Number: 5,520,808
[45] Date of Patent: May 28, 1996

[54] ROTARY SELF-CLEANING STRAINER HAVING IMPROVED UPPER BEARING SEAL

[75] Inventors: James O. Stoneburner; Charles A. Wilkins; Thomas R. Wilkins, all of Ann Arbor, Mich.

[73] Assignee: Perfection Sprinkler Co. (Michigan Corp), Ann Arbor, Mich.

[21] Appl. No.: 500,462

[22] Filed: Jul. 10, 1995

[51] Int. Cl.[6] ................................................. B01D 33/067
[52] U.S. Cl. .................. 210/380.1; 210/393; 210/416.1; 210/499; 210/541
[58] Field of Search ................................ 210/360.1, 373, 210/374, 375, 380.1, 391–394, 416.1, 460, 499, 402–404, 407–412, 251, 541

[56] References Cited

U.S. PATENT DOCUMENTS

| | | | |
|---|---|---|---|
| 4,315,820 | 2/1982 | Mann et al. | 210/408 |
| 4,426,289 | 1/1984 | Svehaug | 210/403 |
| 4,822,486 | 4/1989 | Wilkins et al. | 210/393 |
| 5,108,592 | 4/1992 | Wilkins et al. | 210/409 |
| 5,116,490 | 5/1992 | Fontenot | 210/391 |
| 5,183,568 | 2/1993 | Lescovich | 210/360.1 |
| 5,215,656 | 6/1993 | Stoneburner | 210/393 |
| 5,370,791 | 12/1994 | Lescovich et al. | 210/360.1 |

*Primary Examiner*—Thomas G. Wyse
*Attorney, Agent, or Firm*—George L. Boller

[57] ABSTRACT

A novel bearing-seal for the upper journal of a rotary self-cleaning strainer allows an existing strainer whose upper journal has become too loose to be reconstructed without the necessity of replacing the suction pipe, even though the suction pipe has been grooved by a set of circumferentially spaced wheels previously used for the upper journal. The bearing-seal can also be used in a new strainer instead of such a set of wheels. Where sealing is also required, the inventive bearing-seal has a sealing disc for replacing a previously used curved lip seal. The inventive upper bearing-seal significantly reduces rotational friction, enabling the strainer to be operated with significantly increased power efficiency, offering the potential for effective usage with lower pressure suction pumps.

21 Claims, 10 Drawing Sheets

ROTARY SELF-CLEANING STRAINER HAVING IMPROVED UPPER BEARING SEAL

FIELD OF THE INVENTION

This invention relates to a rotary self-cleaning strainer.

BACKGROUND AND SUMMARY OF THE INVENTION

When water is to be pumped out of an outdoor pit, reservoir, or canal, it is important to prevent debris, such as leaves, sticks, discarded plastic and paper articles, stones, etc., from entering the pump. Rotary self-cleaning strainers that contain cylindrical screens for performing the straining function are often used for this purpose.

The strainer is attached to the end of a conduit and placed in the body of water that is to be pumped. The pump is operated to suck water through the strainer and conduit, as the strainer screen prevents debris from being sucked into the conduit along with the water. Certain debris may adhere to the screen's exterior due to the pump suction force. However, the continued adherence of such debris to the screen's exterior, and resulting impairment of flow through the screen, are prevented by rotating the screen past a nozzle structure which is disposed on the interior of the screen and directs water outwardly through the screen to dislodge the debris. The water is fed under pressure to the strainer through a separate supply line which may be tapped into the pump's outlet. The water acts on only a limited circumferential zone of the screen at any given time to force adhering debris away from the exterior of the screen as the screen revolves past the nozzle structure. The remainder of the screen serves to pass the flow of water that is being sucked by the pump.

Commonly assigned U.S. Pat. Nos. 4,822,486 and 5,108,592 disclose new and improved rotary self-cleaning strainers of this general type. One feature of these strainers is the use of nozzles directed to eject pressurized water against the cylindrical screen to rotate the rotary portion of the strainer and simultaneously dislodge adhering debris from the exterior of the screen. Further improvements are the subject of commonly assigned U.S. Pat. No. 5,356,532.

Annular end closure discs close the opposite axial ends of a rotary portion of the strainer to the non-rotating central core of the strainer. The core comprises a suction pipe through which water from the source being pumped is sucked out of the strainer, and a supply pipe that extends coaxially within the suction pipe to deliver pressurized water to the nozzles that are disposed at the radially outer ends of pipes which are threaded into the wall of the supply pipe. These end closure discs are rigid plastic. An axial end of the rotary portion may be closed to the suction pipe by either a single disc, or by a stack of plural discs. Mounted on these annular end closure discs are means providing for the journaling of the rotary portion on the non-rotating central core about the strainer's longitudinal axis.

In all three of these referenced patents the journaling of the upper end closure to the suction pipe is provided by a series of identical diameter wheels that are mounted on the lower face of the upper annular end closure to rotate about axes that are parallel with the strainer's longitudinal axis. For example, in the latter referenced patent there are four such wheels at ninety degree intervals around the axis of the strainer, defining an imaginary circle that is concentric with the strainer axis and slightly smaller than the I.D. of the annular end closure such that the wheels just touch the O.D. of the suction pipe. In the first two referenced patents, an annular seal is mounted on and sealed against the upper face of the upper end closure around the margin of its I.D. In radial cross section this seal has a lip that curves into sealing contact with the O.D. of the suction pipe. The lower end closure is journaled on the lower end of the central core, but the journaled surface of the central core is not the O.D. of the suction pipe.

Commercially available PVC pipe is typically used as the suction pipe in the strainers described in the referenced patents. It has been discovered that over the life of a strainer the set of journaling wheels often wears a groove around the outside of the PVC suction pipe. This is attributed to the PVC pipe being less hard than the material of the journal wheels. Such a groove creates looseness in the upper journal, and such looseness may ultimately reach a point that defines the end of the useful life of the strainer even though the depth of the groove is insufficient to significantly impair the strength of the suction pipe.

One aspect of the present invention relates to a novel bearing-seal for the upper journal of a rotary strainer that allows a strainer whose upper journal has become too loose to be reconstructed without the necessity of replacing the suction pipe, even though it has been somewhat grooved. Moreover, the inventive bearing-seal allows the reconstruction of the strainer to be performed by the user, thereby avoiding the need for the user to return the strainer to the factory for reconstruction. The several parts forming the inventive bearing-seal can be shipped from the factory to the user as a reconstruction kit, including instructions for performing the reconstruction. An especially significant advantage of such a kit is that it can be conveniently installed without substantial disassembly of the worn-out strainer.

Use of the inventive bearing-seal is not limited just to reconstruction of a worn-out strainer. It can be used to advantage in a new strainer instead of the set of wheels heretofore used for journaling the upper end of the rotary strainer portion on the suction pipe. Where sealing is also required, the inventive bearing-seal can replace the aforementioned curved lip seal.

An especially surprising attribute of using the inventive upper bearing-seal is that rotational friction is significantly minimized. This means that the strainer can be operated with significantly increased power efficiency. Such improved efficiency offers the potential for effective usage with lower pressure pumps. Since pump pressures available at certain sites where the strainers are used are sometimes limited, the inventive bearing-seal offers the opportunity for usage at such sites, thereby providing more widespread usage for such strainers.

The foregoing features, advantages, and benefits of the invention, along with additional ones, will be seen in the ensuing description and claims which are accompanied by drawings. The drawings disclose a presently preferred embodiment of the invention according to the best mode contemplated at this time for carrying out the invention.

DESCRIPTION OF THE PREFERRED EMBODIMENT

FIGS. 1–6 present the general organization and arrangement of a rotary self-cleaning strainer 20 embodying principles of the invention. Strainer 20 comprises a central core 22 that has a longitudinal axis 24 and comprises a smaller diameter cylindrical supply pipe 26 and a larger diameter cylindrical suction pipe 28 that are coaxial with axis 24. Core 22 is a stationary portion of strainer 20 on which a rotary portion 30 of strainer 20 is journaled for rotation about axis 24.

Figure 1:
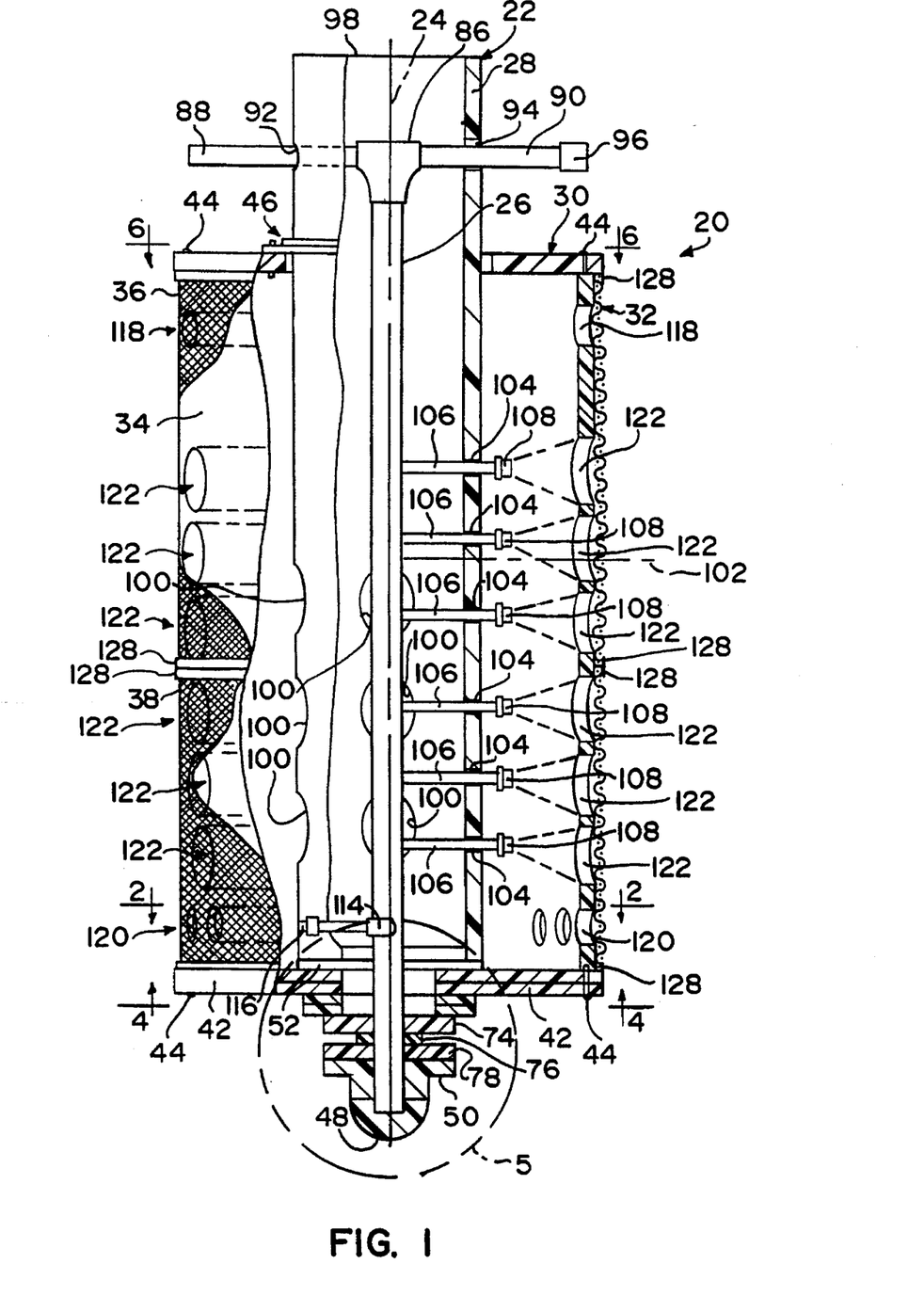
FIG. 1 is a longitudinal view, partly in cross section having certain portions removed for illustrative clarity, through a rotary self-cleaning strainer embodying principles of the invention.

Rotary portion 30 comprises a pipe-strainer screen combination assembly 32 which includes a cylindrical main pipe 34 and two strainer screen assemblies 36 and 38 wrapped fully about and removably fastened to the circumference of main pipe 34. While two assemblies 36 and 38 are used in the illustrated embodiment, the actual number used in any given embodiment of strainer may depend on certain factors such as the size of main pipe 34, or the size of available strainer screen material for fabricating the assemblies.

Rotary portion 30 further includes two annular end closure discs 40 and 42, each securely attached to a respective axial end of main pipe 34 and extending radially inwardly from main pipe 34 to central core 22. The attachment of these discs to the main pipe may be accomplished by passing the shanks of a number of headed screws 44 through holes in the outer perimeter margin of each disc and threading the screw shanks into holes in the ends of main pipe 34 thereby drawing the discs tight against the ends of the main pipe. The discs and main pipe have sufficient thickness to provide a sturdy structural framework for rotary portion 30.

Figure 5:
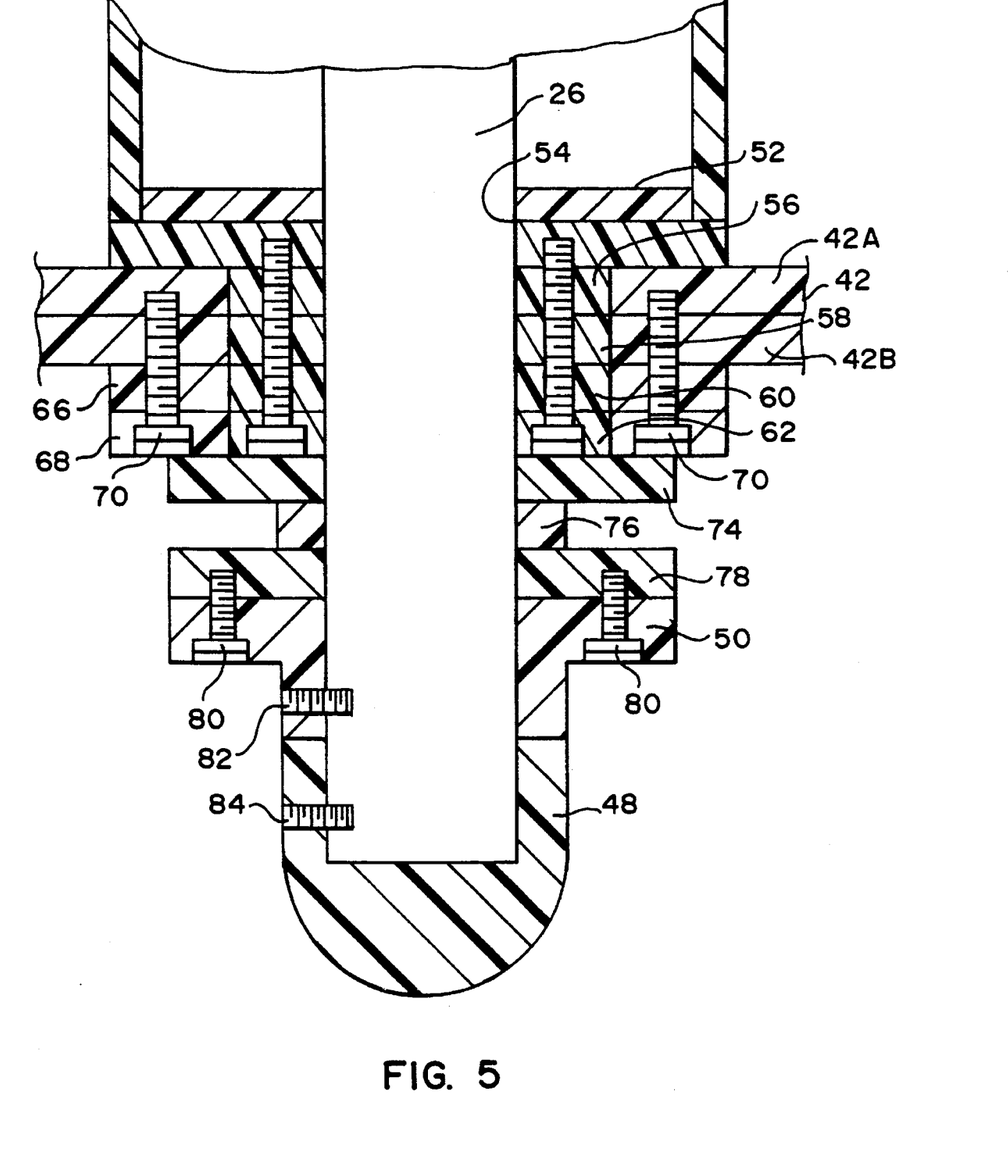
FIG. 5 is an enlarged view in circle 5 in FIG. 1.
Figure 6:
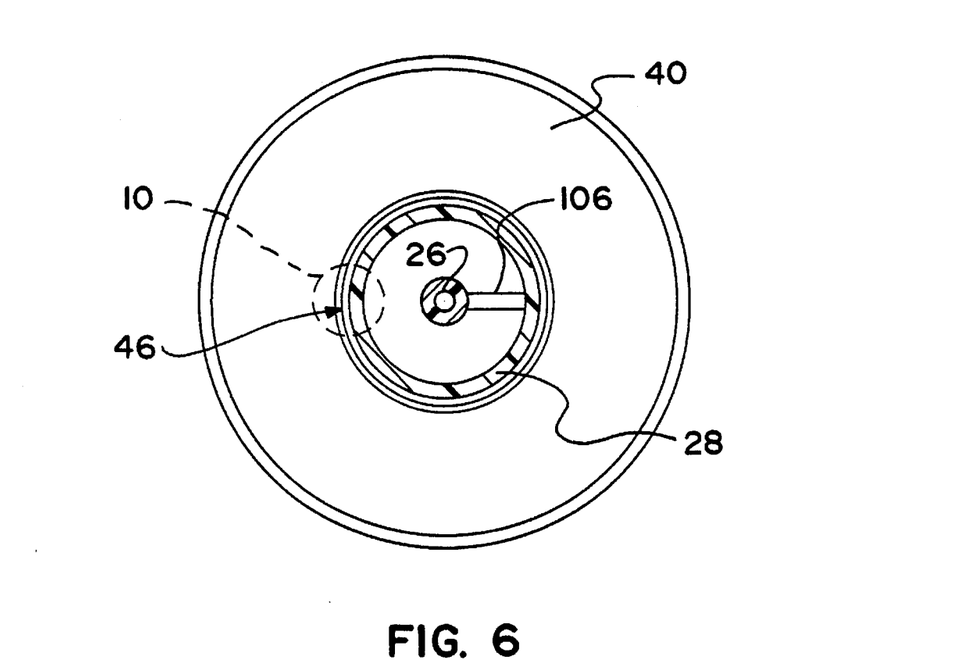
FIG. 6 is a transverse cross sectional view in the direction of arrows 6—6 in FIG. 1.

A bearing-seal 46 embodying principles of the invention journals and seals the upper axial end of rotary portion 30 on central core 22. Details of upper bearing-seal 46 will be described later in conjunction with FIGS. 10–14. The other axial end of rotary portion 30 is journaled by an arrangement that comprises a number of discs shown on a larger scale in FIG. 5, and further includes an end cap 48 and a flange 50 which are fitted to the end of supply pipe 26 and via which the weight of rotary portion 30 is transmitted onto central core 22. A circular annular end cap 52 provides a closure for the lower axial end of suction pipe 28, but has an I.D. 54 that allows supply pipe 26 to pass through. Four identical circular annular discs 56, 58, 60, and 62 form a stack that is disposed against the outer face of end cap 52 and that has an I.D. allowing supply pipe 26 to pass through. Another stack of two identical circular annular discs 66 and 68 is fastened by screws 70 to the outer face of disc 42 so as to be concentric with disc 42 and coaxial with axis 24. The I.D. of this latter two-disc stack is equal to that of disc 42, and just slightly larger than the O.D. of the former four-disc stack. The drawing FIG. 5 shows that disc 42 is actually two individual discs 42A and 42B that are in face-to-face contact. In this way, all discs 52, 54, 56, 58, 60, 62, 66, 68, 42A, and 42B may be fabricated from the same thickness stock.

Three further circular annular discs 74, 76, and 78 are also employed in the arrangement. They have I.D.s that allow them to just fit over supply pipe 26. Disc 74 extends radially outwardly from the supply pipe to fully cover the four-disc stack and radially overlap the radially inner margin of the two-disc stack. Disc 78 is the same size as disc 74 and is concentrically fastened by means of screws 80 to flange 50 coaxial with axis 24. The smaller diameter disc 76 is sandwiched between discs 74 and 78. Flange 50 is also fastened to supply pipe 26 by a threaded fastener 82 that can be a set screw. End cap 48 is fastened to supply pipe 26 by a threaded fastener 84.

With this arrangement discs 56, 58, 60, and 62 form a stationary part and discs 42A, 42B, 66, and 68 a rotary part of a journal for journaling this lower axial end of rotary portion 30 on central core 22. The weight of the rotary portion is transmitted through to flange 50 via discs 74, 76, and 78 which in effect function as thrust washers or thrust bearings. The arrangement of discs at the lower end of the strainer provides suitable sealing. The weight of suction pipe 28 is transmitted through to flange 50 so that it is supply pipe 26 that supports the entire strainer 20 when the strainer is uprightly suspended in a body of water that is to be pumped. It should be observed that journaling of the lower end of the rotary portion does not take place radially between the sidewall of suction pipe 28 and the rotary portion.

For suspending the strainer in this way, and for purposes of moving the strainer, the upper end of supply pipe 26 is provided with a tee 86 and a pair of pipes 88 and 90 that extend from the tee at ninety degrees to axis 24 through respective holes 92, 94 diametrically opposite each other in the sidewall of suction pipe 28. Pipes 88 and 90 extend sufficiently outwardly from suction pipe 28 to be grasped by suitable handling equipment (not shown) for lifting, and to be suspended from a suitable suspension structure (not shown) when installed. The outer end of one of the pipes 88 and 90 is closed by a cap 96 leaving the outer end of the other pipe 88, 90 available for connection to a source of pressurized water (not shown) for operating strainer 20. Holes 92 and 94 are sized in relation to pipes 88 and 90 such that there is no axial play between pipes 26 and 28. This will prevent the four-disc stack that is fastened to cap 52 at the lower end of pipe 28 from being displaced upwardly a distance sufficient to come out of the I.D. of disc 42. Supply pipe 26 thus remains coaxial within suction pipe 28, and rotary portion 30 remains journaled on central core 22 unless strainer 20 is intentionally disassembled.

Suction pipe 28 comprises a discharge 98 that is for connection to a suction source (not shown) when strainer 20 is in use. The typical suction source is a pump that is driven by an electric motor. Discharge 98 is connected through a conduit (not shown) to the suction side of the pump. There is typically a tap at the pressure side (outlet) of the pump that is connected by a conduit (not shown) back to the uncapped one of pipes 88 and 90 to deliver pressurized water to supply pipe 26.

Suction pipe 28 further comprises an intake via which water enters after having been sucked through strainer screen assemblies 36, 38 and underlying apertures in main tube 34. This intake comprises a number of holes 100 extending through the sidewall of suction pipe 28 between end closure discs 40 and 42. In the illustrated embodiment of strainer, holes 100 are circular and arranged in several rows extending around the circumference of the suction pipe. They provide sufficient intake area for the particular diameter of suction pipe, yet do not impair the pipe's strength for the intended purpose of the pipe in the strainer. As can be seen in FIG. 1, the uppermost holes 100 do not extend upwardly beyond a level designated by the numeral 102.

Suction pipe 28 further comprises a vertical row of six additional, and smaller, circular holes 104. These holes 104 provide for a like number of straight branch supply pipes 106 to pass radially through suction pipe 28 from supply pipe 26 toward pipe-strainer screen combination 32. The inner ends of pipes 106 tap into holes in the sidewall of supply pipe 26. Nozzles 108 attach to the outer ends of pipes 106 and are aimed directly at combination 32.

Below the row of holes 104 and at ninety degrees to them, suction pipe 28 contains two additional holes 110 diametrically opposite each other. These holes 110 provide for two branch supply pipes 112 to pass through suction pipe 28 from supply pipe 26 toward combination 32. Unlike the straight branch supply pipes 106, each branch supply pipe 112 contains an elbow 114. The inner end of each pipe 112 is tapped into a corresponding hole in supply pipe 26 while the outer end contains a nozzle 116 that is aimed in a direction that has both a radial and a tangential component relative to axis 24.

When pressurized water is delivered to supply pipe 26, it is distributed to the branch pipes and emitted from the nozzles. As will become more apparent from the ensuing description, nozzles 116 are drive nozzles that serve to rotate rotary portion 30 while nozzles 108 are cleaning nozzles that serve to clean those portions of combination 32 through which water is sucked into the strainer.

Main pipe 34 is multi-apertured, comprising three distinct aperture, or hole, patterns in its sidewall. The uppermost pattern is a single row of breather holes 118. The lowermost pattern is a single row of drive holes 120. The axially intermediate pattern comprises multiple rows of holes 122.

Holes 120 are the smallest of the three and are circular holes that are of equal diameter and each of which is equidistant from its immediately circumferentially adjacent holes. Breather holes 118 are circular and somewhat larger in diameter than holes 120; they are also spaced farther apart from each other than are holes 120 from each other. Holes 122 are the largest diameter of all three, being circular holes arranged in six circumferentially extending rows. As may be seen, there exists some circumferential offset between each row of holes 122 and an immediately axially adjacent row. The presence of holes in pipe 34 does not impair its strength for its intended purpose in the strainer.

The centers of holes 122 in each of the six rows of holes 122 lie in a plane that is perpendicular to axis 24. A corresponding one of the six branch supply pipes 106 also lies in each plane, and the corresponding cleaning nozzle 108 is aimed along a radial in the plane toward combination 32.

Figure 2:
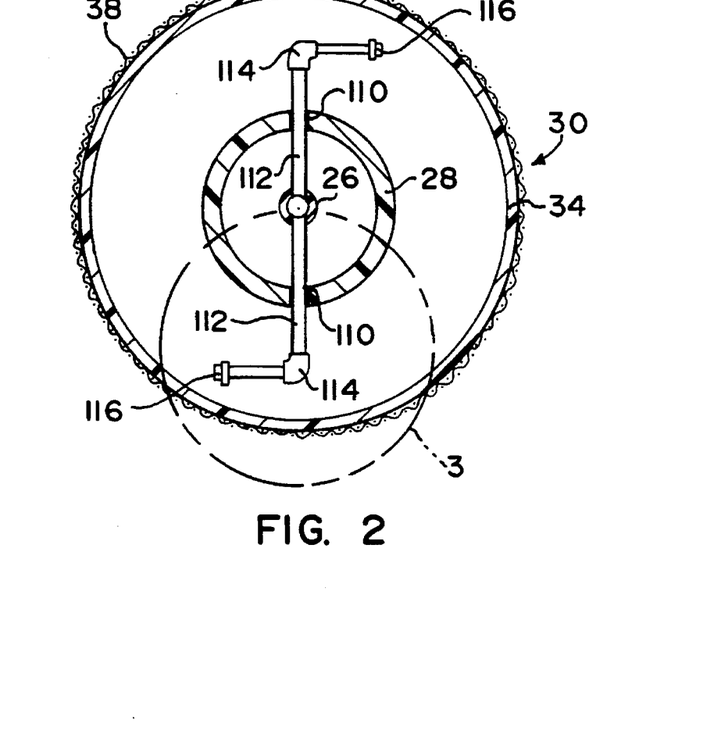
FIG. 2 is a transverse cross sectional view in the direction of arrows 2—2 in FIG. 1.
Figure 3:
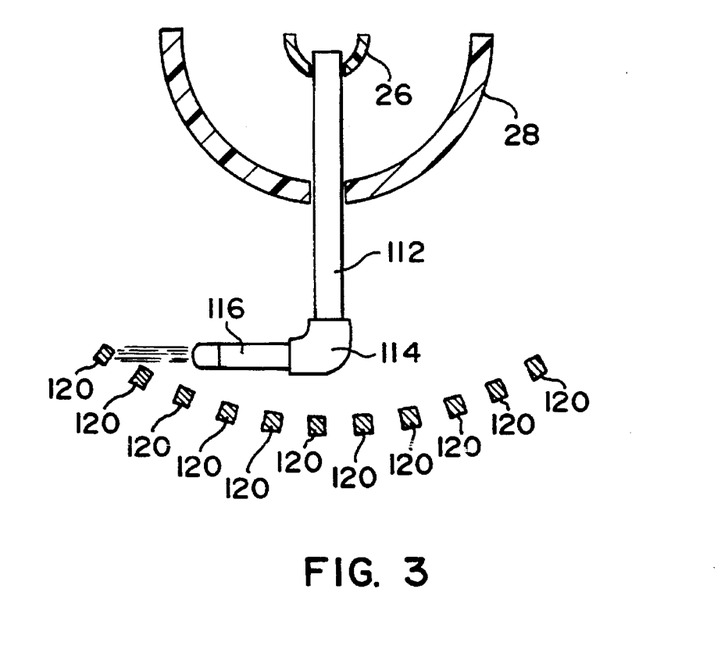
FIG. 3 is an enlarged view in circle 3 in FIG. 2.
Figure 4:
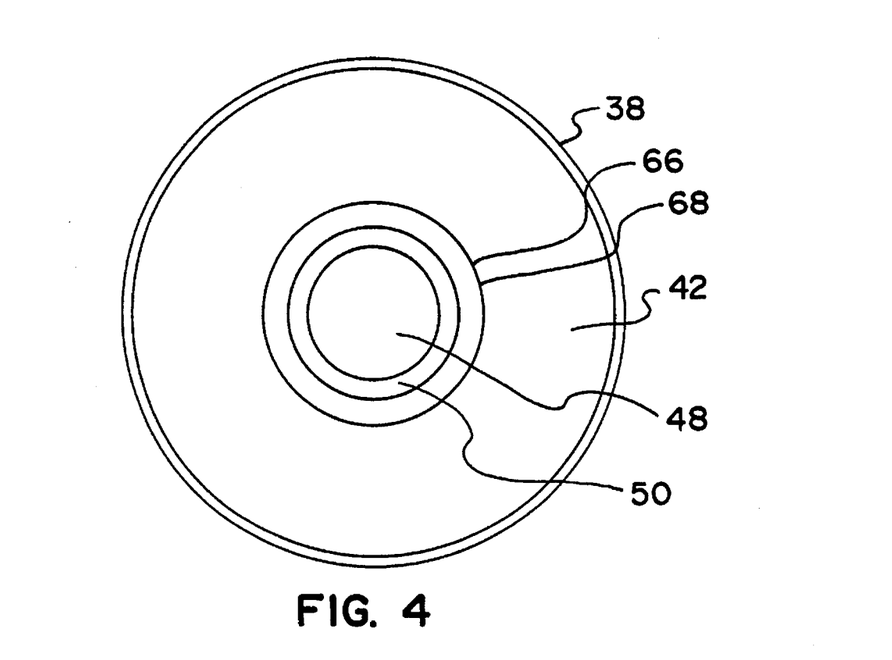
FIG. 4 is a transverse view in the direction of arrows 4—4 in FIG. 1.

FIGS. 2 and 3 illustrate how drive nozzles 116 are arranged relative to drive holes 120. The centers of drive holes 120 lie in a plane that is perpendicular to axis 24. Branch supply pipes 112 also occupy this plane, and each nozzle 116 is aimed toward the circular row of drive holes 120, but in a direction that has both a radial and a tangential component. Main pipe 34 has a thickness that provides each drive hole 120 with a certain surface area for the hole's particular diameter. Since the drive holes are relatively small in diameter and closely spaced, pressurized water emitted from nozzles 116 will impact a portion of the surface area of one or more of the drive holes 120. The particular portion of the surface area impacted may be generally described as that portion which generally faces a drive nozzle 116, although it is to be appreciated that the impact is not normal to the particular surface area impacted.

The combination of the impacted surface area of the drive holes, the proximities of the drive holes to each other around the circumference of main pipe 34 and to drive nozzles 116, and the force with which water is emitted from the drive nozzles is such in relation to the resistance of rotary portion 30 to rotation on central core 22, that the rotational resistance is overcome, and hence rotation is imparted to rotary portion 30. Holes 120 therefore form a succession of reaction surfaces around the circumference of main pipe 34 that are repeatedly impacted by water from nozzles 116 to both start and to maintain the rotation. The impact force has both a tangential and a radial component, and it is the tangential component that imparts the rotation.

Because the reaction surfaces are parts of holes through the wall of main pipe 34, the impacting water from nozzles 116 can pass outwardly through the holes 120 after having impacted with a hole's wall surface. This is advantageous in achieving efficient use of the available force since the holes provide a very suitable means of escape for the water after impact. This drive arrangement is superior to turbine or paddle types of reaction surfaces because the reaction surfaces are in effect embedded in the sidewall of the tube, and unlike turbine blades or paddles, are not sticking out into the body of water where they would inherently create efficiency-reducing drag on the rotary motion. A still further advantage is that the holes can be created by drilling so that the need to fabricate and assemble blades or paddles to the rotary portion of a strainer is avoided.

Because rotation is efficiently imparted by the drive arrangement of the present invention, the cleaning function can be performed more efficiently as well. Thus cleaning nozzles 108 can emit water essentially radially, without a tangential component. This will produce maximum force for dislodging debris that may adhere to the outside of combination 32. As rotary portion 30 rotates, holes 122 pass in succession across cleaning nozzles 108. The water emitted from cleaning nozzles 108 dislodges adhering debris from screen that covers holes 122. Cleaning of the screen by means of cleaning nozzles 108 can be effective even if they are not aimed exactly radially. In other words, substantial radial aiming of the cleaning nozzles, even as much as twenty-two and one-half degrees from radial, is for most debris-removing purposes almost as fully effective as perfect radial aiming. It is the drive nozzles, not the cleaning nozzles, that rotate the rotary portion of the strainer. The cleaning nozzles by themselves remain incapable of rotating the rotary portion of the strainer.

Where strainer 20 is intended to be only partially submerged in a body of water that is to be pumped so that the surface of the body of water lies between level 102 and breather holes 118, sealing of upper disc 40 to central core 22 would be unnecessary. If a strainer is intended for total immersion, sealing of upper disc 40 to central core 22 is used, and so the bearing-seal 46 of the present invention provides not only the journaling, but also such sealing, of the upper rotary portion of the strainer on the central core.

Figure 7:
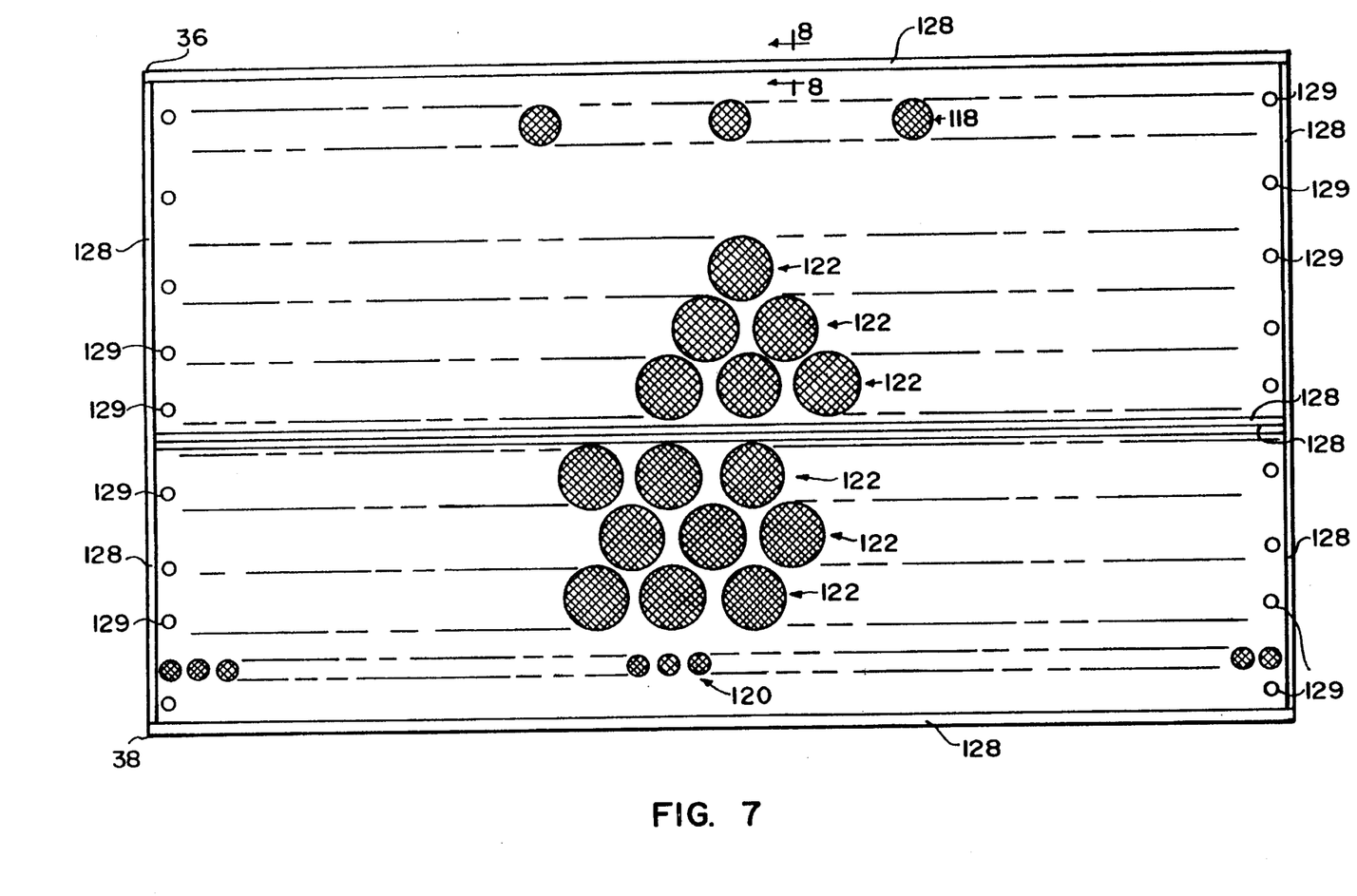
FIG. 7 is a plan view of a mesh-backing sheet assembly by itself apart from the strainer of the previous Figs.
Figure 8:
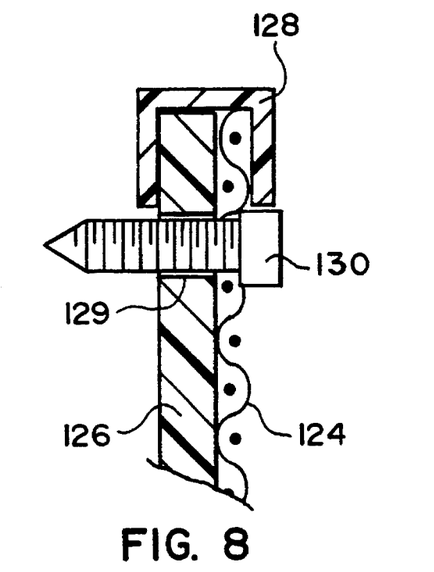
FIG. 8 is a fragmentary cross sectional view, on an enlarged scale, in the direction of arrows 8—8 in FIG. 7.

Each backing sheet 126 is rectangular and has a pattern of apertures corresponding exactly to the underlying apertures in main pipe 34. Each mesh screen 124 is rectangular, congruently matching the underlying backing sheet except for the backing sheet's apertures which the mesh is intended to cover, The mesh screen and backing sheet are superimposed in registry and channel 128 is pushed on over their perimeter margins.

Each assembly 36, 38 is assembled to main pipe 34 as follows. Backing sheet 126 contains a number of small clearance holes 129 for fastening screws 130. Holes 129 are located every several inches along the vertical margin. Main pipe 34 contains a matching pattern of small holes into which screws 130 thread. One of the vertical margins of an assembly 36, 38 is placed against the wall of pipe 34 and fastened to it. The assembly is then wrapped tightly around the full circumference of the pipe and fastened along its other vertical margin. This disposes strainer screen mesh in covering relation to all apertures in the sidewall of pipe 34. Channel 128 provides satisfactory sealing of the marginal edge portions of the assemblies to pipe 34. Whenever an assembly 36, 38 has to be removed for any reason, fasteners 130 are simply unscrewed and the assembly removed.

The various parts of strainer 20 are fabricated from readily available materials. The various pipes are fabricated from conventional PVC pipe. The various discs are plastic, such as polyethylene. Certain of the discs that bear significant loads are preferably UHMW plastic. The nozzles are metal.

Details of one specific embodiment of strainer 30, and the method of making it, are disclosed in the third of the commonly assigned patents mentioned above. In any submerged version where holes 92 and 94 would be below the surface of the water, they should be sealed in a leak-proof fashion to pipes 88 and 90, and such a version that is always intended to be submerged could also omit the breather holes 118.

Because of the presence of upper bearing-seal 46, the illustrated strainer can be operated either fully, or only partially, submerged. If the strainer is to be operated only partially submerged, the seal portion of the upper bearing-seal could be omitted.

Figure 9:
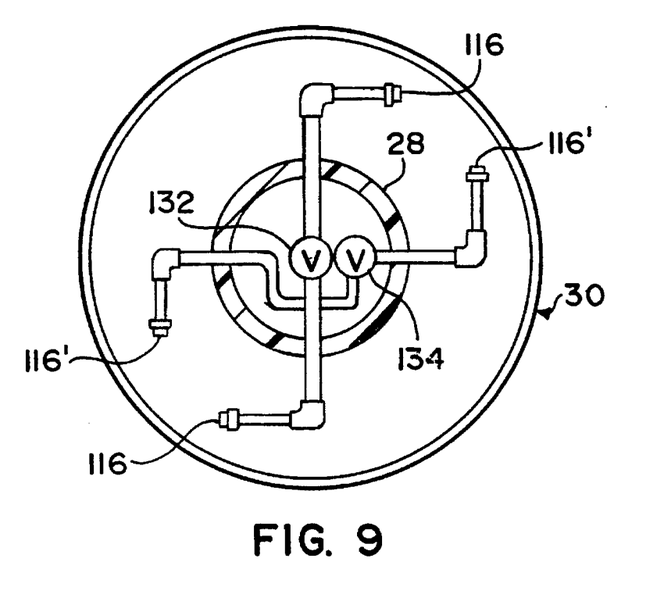
FIG. 9 is a view in the same direction as that of FIG. 2, but depicting another embodiment.

FIG. 9 discloses a modified form of drive which has a bi-directional capability. In addition to the two drive nozzles 116, there is a second set of drive nozzles 116' that are at ninety degrees to the first set 116 about axis 24. Nozzles 116' are symmetrically opposite nozzles 116, and only one set of nozzles is operated at a time. When set 116 is operated, rotary portion 30 turns as described earlier. However when set 116' is operated, the rotary portion turns in the opposite direction. Selection of a nozzle set is controlled by suitable valve means, such as a pair of solenoid valves 132, 134 that are arranged to control the flow from supply pipe 26 to the two nozzle sets. When solenoid valve 132 is operated, set 116 is selected. When solenoid 134 is operated, set 116' is selected.

The ability to rotate in either direction may be advantageous at certain times. For example, if any portion of the rotary portion 30 were to have an interference with a portion of the central core 22 that would interfere with the rotation, the strainer could be operated in an oscillatory manner by reversing just before the obstruction would otherwise be encountered. A suitable sensor, such as limit switch means could be used to control the operation of the solenoid valves in that case. Another possibility would be to simply use a timer to periodically reverse the rotation, and where no obstructional situation exists in the strainer, a timer could be used to reverse the rotation at desired time intervals.

Attention is now directed to the inventive bearing-seal 46 with reference to FIGS. 10–14. Bearing-seal 46 comprises an inner bearing ring 150, an outer bearing ring 152, a mounting ring 154, a sealing ring 156, and a spacer ring 158. Each of these rings has a circular I.D. and a circular O.D. The inner and outer bearing rings 150, 152 are UHMW polymers, with the former having a higher molecular density than the latter. The other rings 154, 156, 158 are preferably polyethylene.

Figure 10:
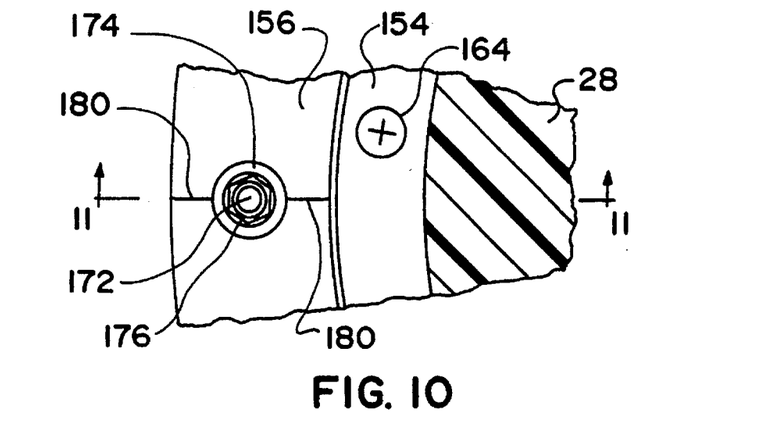
FIG. 10 is a fragmentary view, on an enlarged scale, in circle 10 in FIG. 6.
Figure 11:
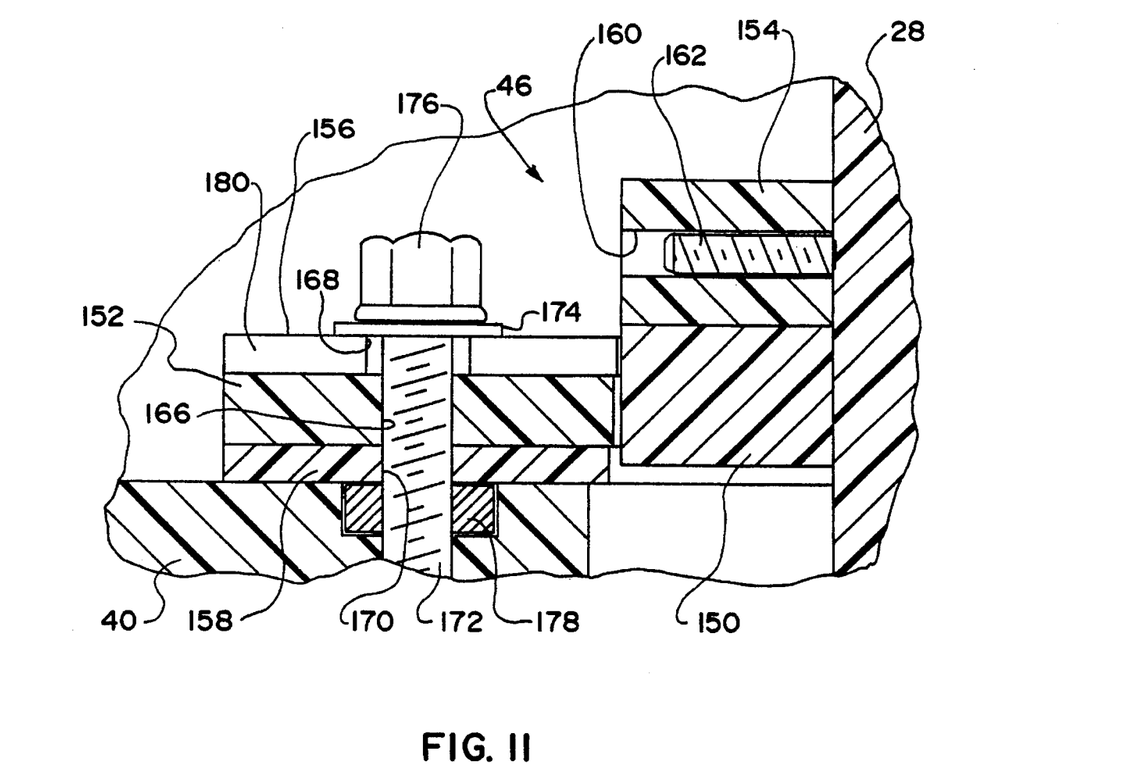
FIG. 11 is a fragmentary cross section, on an enlarged scale, in the direction of arrows 11—11 in FIG. 10.
Figure 12:
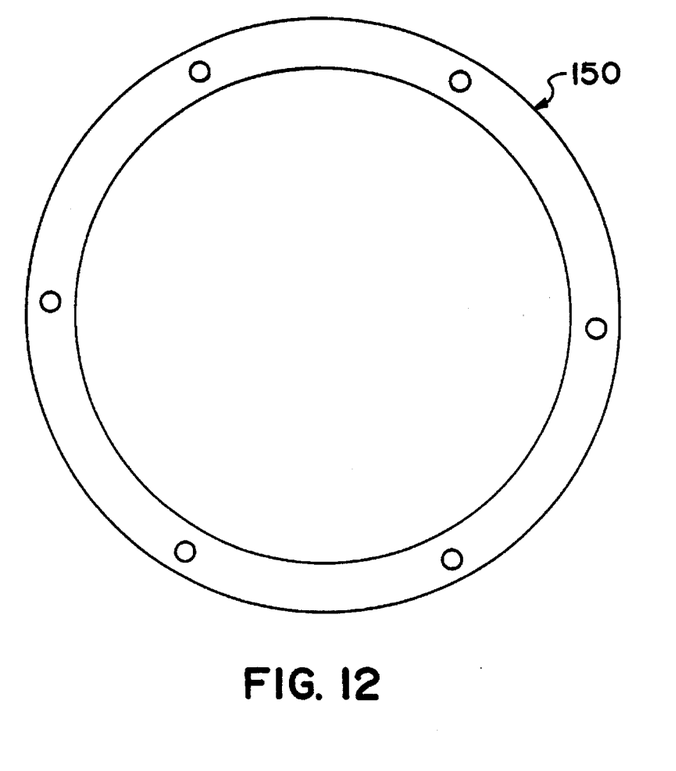
FIG. 12 is a top plan view of one element of the upper bearing-seal of the present invention by itself.

Inner bearing ring 150 and mounting ring 154 are disposed in fixed relation to suction pipe 28. The two rings are of equal size in the disclosed embodiment. Mounting ring 154 comprises a series of circumferentially spaced radial tapped through-holes 160. Threaded into each hole is a set screw 162 whose outer end has a shape for engagement by a tool (not shown) for threading the screw into the hole so that the inner tip end abuts the outside of the suction pipe. The inner end of the set screw is cupped to bite slightly into the wall surface of the suction pipe for a secure attachment.

Mounting ring 154 also has a series of circumferentially spaced axial through-holes that are circumferentially offset from through-holes 160. Inner bearing ring 150 has a pattern of tapped axial holes that register with the axial through-holes in mounting ring 154. The shanks of headed screws 164 pass through the holes in mounting ring 154 and are threaded into the tapped holes in the inner bearing ring to securely join the two in face-to-face abutment.

Each of the three rings 152, 156, 158 comprises registering patterns of circumferentially spaced through-holes 166, 168, 170, as shown by FIG. 11. Projecting upwardly from the upper end closure disc 40 are the distal ends of the threaded shanks of bolts 172 in the same pattern as the patterns of holes 166, 168, 170. The threaded shanks pass through these registered hole patterns. Holes 166, 170 have tight fits on the bolts that prevent radial play of their respective rings on the end closure disc. Holes 168 are however, slightly larger diameter to allow some radial play of sealing ring 156. A washer 174 is disposed over the end of each bolt shank and against the upper face of sealing ring 156 around a respective hole 168. A self-locking nut 176 is then threaded onto the end of the bolt shank and tightened to secure the three rings in face-to-face relation, but not tightened to the point that prevents sealing ring 156 from floating radially. Each bolt The fit of rings 152 and 158 on the annular end disc positions the rings such that the entire I.D. of outer bearing ring 152 will lie radially inward of the entire I.D. of spacer ring 158, the I.D. of ring 152 being slightly smaller. The I.D. of sealing ring 156 is also slightly smaller than that of outer bearing ring 152. Each bolt 172 is mounted on end closure disc 40 by threading the bolt from the lower face of the disc through a captured nut 178, and tightening the bolt head against the lower face of the disc. FIG. 11 shows nut 178 contained in a counter bore of a single end closure disc, but if the end closure disc comprise a stack of two discs, the nut could be captured in a circular hole in the upper disc of the stack that is larger in diameter than the registering hole in the lower disc of the stack.

The illustrated embodiment of upper bearing-seal is adapted not only for use in a new strainer, but also as a replacement kit for pre-existing strainers. Such preexisting strainers have hole patterns in their upper end closure disc for the journal wheels that were mentioned earlier. The hole patterns of the illustrated rings 152, 156, 158 are designed to register with those pre-existing patterns. Where the pre-existing strainers have threaded shanks projecting upwardly from these holes, they may be used. Alternatively, the wheels and their fastenings may be removed and discarded in favor of a nut and bolt arrangement like that shown here. To mount the mounting ring-inner bearing ring on the suction tube, it will typically be necessary to remove any interfering horizontal pipe sections, such as 88, 90, before the rings can be properly positioned on the suction pipe. The removed pipe sections are later reinstalled.

Figure 13:
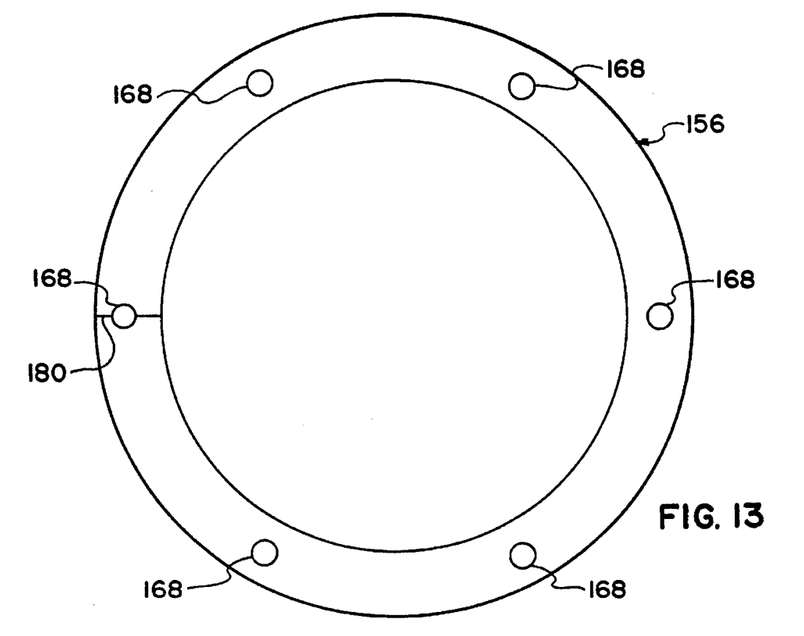
FIG. 13 is a top plan view of another element of the upper bearing-seal of the present invention by itself.
Figure 14:
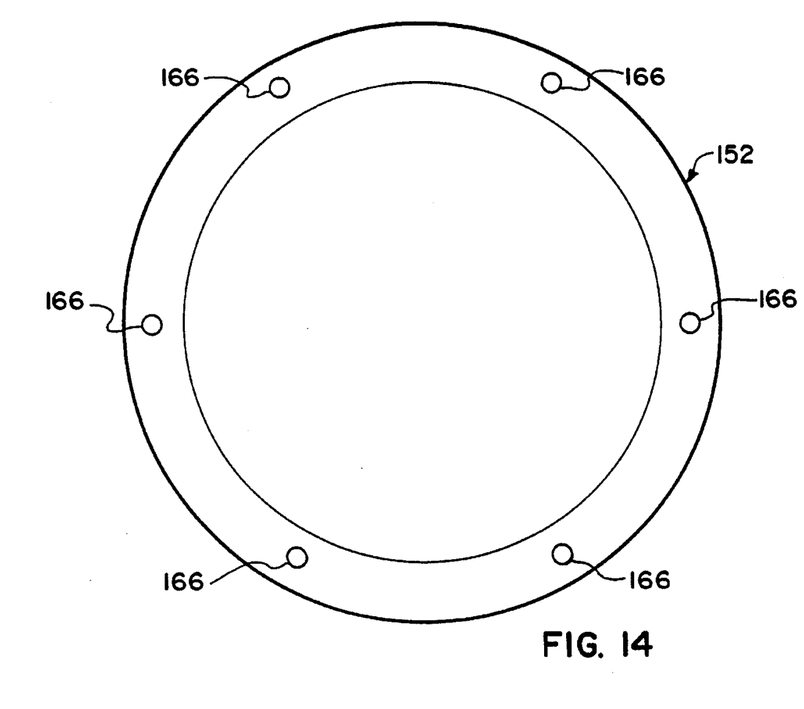
FIG. 14 is a top plan view of yet another element of the upper bearing-seal of the present invention by itself.

Sealing ring has a radial split 180 that passes through one of its through-holes. This can facilitate placement of the sealing ring around the suction pipe, and the use of washer 174 to overlap both sides of the split assures that in use, the ring will not warp at the split.

The spacer ring 158 is used for certain pre-existing strainers, and in a new strainer, it may not be required since dimensional changes can be made to eliminate its necessity.

Figure 15:
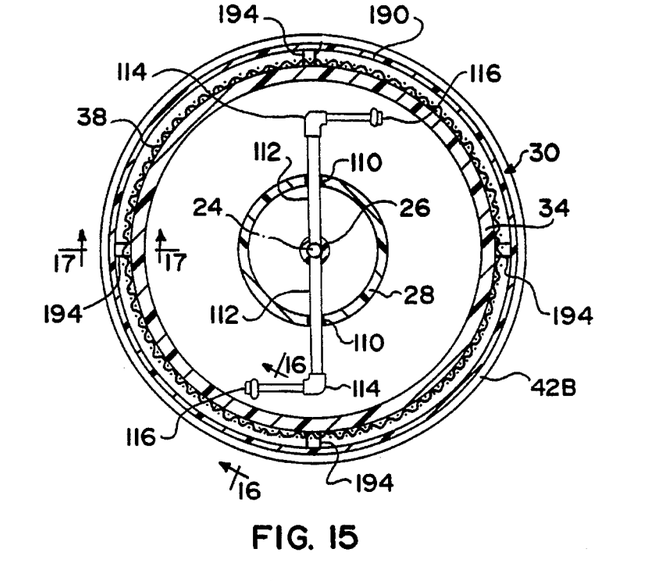
FIG. 15 is a cross section view similar to FIG. 2 showing a modification.
Figure 16:
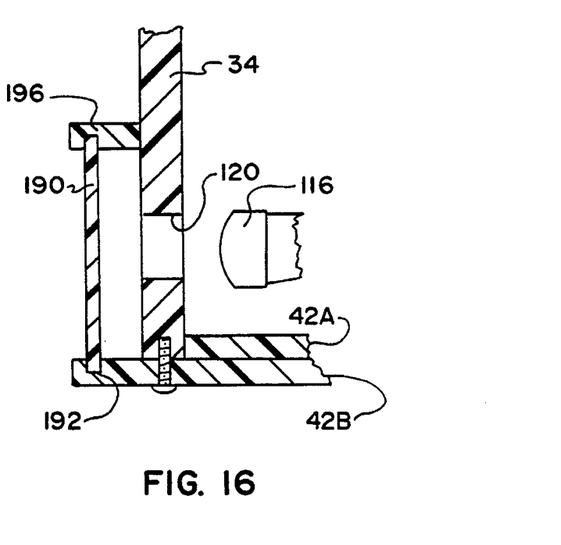
FIG. 16 is a fragmentary cross section view, on an enlarged scale, in the direction of arrows 16—16 in FIG. 15.
Figure 17:
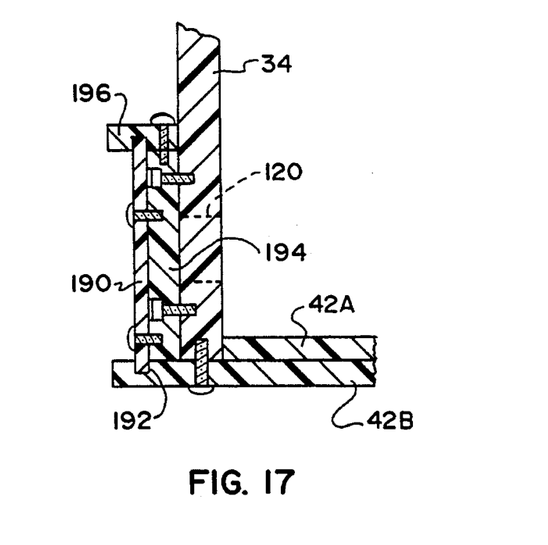
FIG. 17 is a fragmentary cross section view, on an enlarged scale, in the direction of arrows 17—17 in FIG. 15.

FIGS. 15–17 illustrate a modified form of drive in which a short axial wall 190, concentric with axis 24, is disposed on rotary portion 30 spaced radially outwardly of, and circumferentially bounding, the single row of drive holes 120. The mounting of wall 190 is accomplished by utilizing a larger O.D. disc 42B forming a ledge having a groove 192 into which the lower margin of wall 190 is inserted. Several spacers 194 are fastened to the outside of the screen covered pipe 34 at certain circumferential locations. A retaining ring 196 is fastened to the tops of spacers 194 and has a groove 198 into which the upper margin of wall 190 is fitted. Wall 190 has been found beneficial in improving the efficiency of the drive for rotating the rotary portion of the strainer. One-eighth thick polyethylene is a suitable material for wall 190.

While a presently preferred embodiment of the invention has been illustrated and described, it should be appreciated that principles of the invention are applicable to other embodiments within the scope of the following claims.

What is claimed is:

1. A self-cleaning rotary strainer for insertion into a body of debris-containing liquid to prevent debris in the liquid from passing through the strainer, said strainer comprising a central core having an axis and a rotary portion disposed on said central core to rotate about said central core and said axis, said central core comprising a main cylindrical pipe that is coaxial with said axis and that comprises an intake and a discharge at spaced locations along its length, said discharge serving to deliver strained liquid from the strainer and said intake serving to communicate said pipe to such a body of liquid so that liquid can flow into said pipe via said intake, conveyed through said pipe, and discharged from said pipe via said discharge, said rotary portion comprising cylindrical strainer means that is coaxial with and spaced radially outward of said central core in surrounding relation to said intake for straining debris from liquid before the liquid can enter said intake, said central core further comprising a supply pipe extending axially within said main pipe, distributor piping that is fluid-connected with said supply pipe and extends from said central core to terminate in nozzle means aimed toward said cylindrical strainer means for supplying pressurized liquid to rotate said rotary portion and simultaneously dislodge debris from the exterior of said cylindrical strainer means, said rotary portion further comprising annular end closures at respective axial ends of said cylindrical strainer means for respectively closing said axial ends of said strainer means to said central core, respective journal means for respectively journaling said annular end closures to said central core for journaling the rotation of said rotary portion on and about said central core, one of said respective journal means being disposed axially between said discharge and said intake on one of said annular end closures that is also disposed axially between said intake and said discharge, characterized in that said one journal means comprises a UHMW inner bearing ring having a circular I.D. and a circular O.D. disposed around the outside of said main pipe coaxial with said axis, means mounting said inner bearing ring on said main pipe such that said inner bearing ring is located axially between said intake and said discharge, a UHMW outer bearing ring having a circular I.D. just slightly larger than the O.D. of said inner bearing ring, and means mounting said outer bearing ring on said one annular end closure such that the I.D. of said outer bearing ring is disposed around the O.D. of said inner bearing ring.

2. A self-cleaning rotary strainer as set forth in claim 1 in which said one journal means further comprises a sealing ring disposed over said main pipe concentric with said outer bearing ring and mounted against a face of said outer bearing ring that faces axially in the direction of said discharge, said sealing ring comprising a circular I.D. that is just slightly smaller than that of said outer bearing ring.

3. A self-cleaning rotary strainer as set forth in claim 2 in which said circular I.D. of said sealing ring is just slightly larger than the O.D. of said inner bearing ring, and the circular I.D. of said sealing ring bounds the O.D. of said inner bearing ring.

4. A self-cleaning rotary strainer as set forth in claim 2 in which said sealing ring and said outer bearing ring have matching patterns of axial through-holes.

5. A self-cleaning rotary strainer as set forth in claim 4 in which said through-holes of said sealing ring have larger diameters than the corresponding through-holes of said outer bearing ring.

6. A self-cleaning rotary strainer as set forth in claim 5 in which said sealing ring is split radially at one of its through-holes.

7. A self-cleaning rotary strainer as set forth in claim 4 in which said mounting means for mounting said outer bearing ring on said one annular end closure comprises fasteners that extend from said one annular end closure for fastening both said sealing ring and said outer bearing ring to said one annular end closure via their respective through-holes, said sealing ring is split radially at one of its through-holes, and a fastener that is disposed at said one through-hole of said sealing ring and the corresponding through-hole of said outer bearing ring comprises a part having a diameter that overlaps said sealing ring on both sides of said split and is disposed against said sealing ring.

8. A self-cleaning rotary strainer as set forth in claim 2 in which said sealing ring comprises a number of circumferentially spaced through-holes extending axially through itself, and said sealing ring is also split radially at one of its through-holes.

9. A self-cleaning rotary strainer as set forth in claim 2 in which said sealing ring comprises a number of circumferentially spaced through-holes extending axially through itself that are in registry with respective through-holes extending axially through said outer bearing ring, and further including a spacer ring disposed axially between said outer bearing ring and said one annular end closure, said spacer ring having a circular I.D. that is slightly larger than that of said outer bearing ring and through-holes that are in registration with and have the same diameter as the through-holes of said outer bearing ring.

10. A self-cleaning rotary strainer as set forth in claim 1 in which said one journal means further comprises a sealing ring disposed over said main pipe concentric with said outer bearing ring and disposed against a face of said outer bearing ring that faces axially in the direction of said discharge, said mounting means for mounting said outer bearing ring on said one annular end closure comprises fasteners that extend from said one annular end closure through registered through-holes in both said outer bearing ring and said sealing ring for fastening both said sealing ring and said outer bearing ring to said one annular end closure via their respective through-holes, said through-holes of said sealing ring having larger diameters than the respective ones of said outer bearing ring, said through-holes of said outer bearing ring having a fit to the respective fastener that prevents radial play of said outer bearing ring relative to said one annular end closure, and said fasteners holding said sealing ring against said outer bearing ring, but allowing radial play of said sealing ring on said outer bearing ring.

11. A self-cleaning rotary strainer as set forth in claim 10 in which said sealing ring comprises a circular I.D. that is just slightly smaller than that of said outer bearing ring.

12. A self-cleaning rotary strainer as set forth in claim 11 in which the I.D.s of both said sealing ring and said outer bearing ring are disposed around the O.D. of said inner bearing ring.

13. A self-cleaning rotary strainer as set forth in claim 12 in which said sealing ring is polyethylene having an axial thickness that is less than the axial thickness of said outer bearing ring, the axial thickness of said inner bearing ring is greater than the sum of the axial thickness of both said sealing ring and said outer bearing ring, and said inner bearing ring axially overlaps both said sealing ring and said outer bearing ring.

14. A self-cleaning rotary strainer as set forth in claim 1 in which said outer bearing ring and said inner bearing ring have different molecular densities.

15. A self-cleaning rotary strainer as set forth in claim 14 in which said outer bearing ring has a lower molecular density than that of said inner bearing ring.

16. A self-cleaning rotary strainer as set forth in claim 1 in which said means mounting said inner bearing ring on said main pipe comprises a mounting ring of material different from that of said inner bearing ring which is disposed against a face of said inner bearing ring that faces axially in the direction of said discharge and which is fastened to said inner bearing ring, and means fastening said mounting ring to said main pipe.

17. A self-cleaning rotary strainer as set forth in claim 16 further including a sealing ring disposed over said main pipe concentric with said outer bearing ring and mounted against a face of said outer bearing ring that faces axially in the direction of said discharge, said sealing ring being disposed axially just beyond said mounting ring relative to said discharge.

18. A self-cleaning rotary strainer as set forth in claim 1 in which said rotary portion comprises a cylindrical tube which is open at opposite axial ends and is attached to said annular end closures, and which contains multiple apertures extending between radially inner and radially outer sidewall surfaces, said cylindrical tube being coaxial with, but spaced radially outwardly of, said main pipe, means mounting said cylindrical strainer means about said cylindrical tube in covering relation to said apertures to allow liquid, but not debris, to pass through said apertures.

19. A self-cleaning rotary strainer as set forth in claim 18 in which said distributor piping terminates in first and second nozzle means that are aimed toward said cylindrical tube's sidewall, said first nozzle means being aimed substantially radially as viewed along said axis such that pressurized liquid emitted from said first nozzle means is incapable of rotating said strainer means, said second nozzle means being aimed toward a circumferential succession of certain ones of said apertures such that pressurized liquid emitted from said second nozzle means is reacted against surface portions of said certain ones of said apertures with a component of force that is tangential to said axis and sufficiently large to rotate said strainer means, said first nozzle means being aimed such that pressure fluid emitted from said first nozzle means passes through certain other of said apertures as said strainer means rotates to dislodge debris from said strainer means where said strainer means is in covering relation to said certain other of said apertures.

20. A journal kit for reconstructing a self-cleaning rotary strainer of the type that is inserted into a body of debris-containing liquid to prevent debris in the liquid from passing through the strainer, said strainer comprising a central core having an axis and a rotary portion disposed on said central core to rotate about said central core and said axis, said central core comprising a main cylindrical pipe that is coaxial with said axis and that comprises an intake and a discharge at spaced locations along its length, said discharge serving to deliver strained liquid from the strainer and said intake serving to communicate said pipe to such a body of liquid so that liquid can flow into said pipe via said intake, conveyed through said pipe, and discharged from said pipe via said discharge, said rotary portion comprising cylindrical strainer means that is coaxial with and spaced radially outward of said central core in surrounding relation to said intake for straining debris from liquid before the liquid can enter said intake, said central core further comprising a supply pipe extending axially within said main pipe, distributor piping that is fluid-connected with said supply pipe and extends from said central core to terminate in nozzle means aimed toward said cylindrical strainer means for supplying pressurized liquid to rotate said rotary portion and simultaneously dislodge debris from the exterior of said cylindrical strainer means, said rotary portion further comprising annular end closures at respective axial ends of said cylindrical strainer means for respectively closing said axial ends of said strainer means to said central core, respective journal means for respectively journaling said annular end closures to said central core for journaling the rotation of said rotary portion on and about said central core, one of said respective journal means being disposed axially between said discharge and said intake on one of said annular end closures that is also disposed axially between said intake and said discharge, characterized in that said kit comprises parts for replacing said one journal means, said parts including a UHMW inner bearing ring having a circular I.D. and a circular O.D. for disposition around the outside of said main pipe coaxial with said axis, means for mounting said inner bearing ring on said main pipe such that said inner bearing ring is located axially between said intake and said discharge, a UHMW outer bearing ring having a circular I.D. just slightly larger than the O.D. of said inner bearing ring, and means for mounting said outer bearing ring on said one annular end closure such that the I.D. of said outer bearing ring will be disposed around the O.D. of said inner bearing ring.

21. A journal kit as set forth in claim 20 further including a sealing ring for disposition over said main pipe concentric with said outer bearing ring and mounting against a face of said outer bearing ring that faces axially in the direction of said discharge, said sealing ring comprising a circular I.D. that is just slightly smaller than that of said outer bearing ring.

* * * * *